A. KIMBLE.
AUTOMATIC SAFETY BRAKE.
APPLICATION FILED AUG. 22, 1921.

1,433,553.

Patented Oct. 31, 1922.

Inventor
Austin Kimble,
By Kummler & Kummler
Attys

Patented Oct. 31, 1922.

1,433,553

UNITED STATES PATENT OFFICE.

AUSTIN KIMBLE, OF WAUSAU, WISCONSIN, ASSIGNOR TO MARATHON ELECTRIC MFG. CO., OF WAUSAU, WISCONSIN, A CORPORATION OF WISCONSIN.

AUTOMATIC SAFETY BRAKE.

Application filed August 22, 1921. Serial No. 494,254.

*To all whom it may concern:*

Be it known that I, AUSTIN KIMBLE, a citizen of the United States of America, and a resident of Wausau, county of Marathon, and State of Wisconsin, have invented certain new and useful Improvements in Automatic Safety Brakes, of which the following is a specification.

The main objects of this invention are to provide an improved form of brake mechanism for use with power transmission apparatus which is intermittently started and stopped; to provide improved means for normally urging the brake into position to prevent the operation of the transmission apparatus; to provide an improved mechanism controlled by the cutting in and off of power to the transmission apparatus for automatically retracting and releasing the brake mechanism; and to provide an improved automatic safety brake mechanism of this kind which is particularly adapted for use with electric elevator apparatus.

An illustrative embodiment of this invention is shown in the ccompanying drawings, in which—

Figure 1:
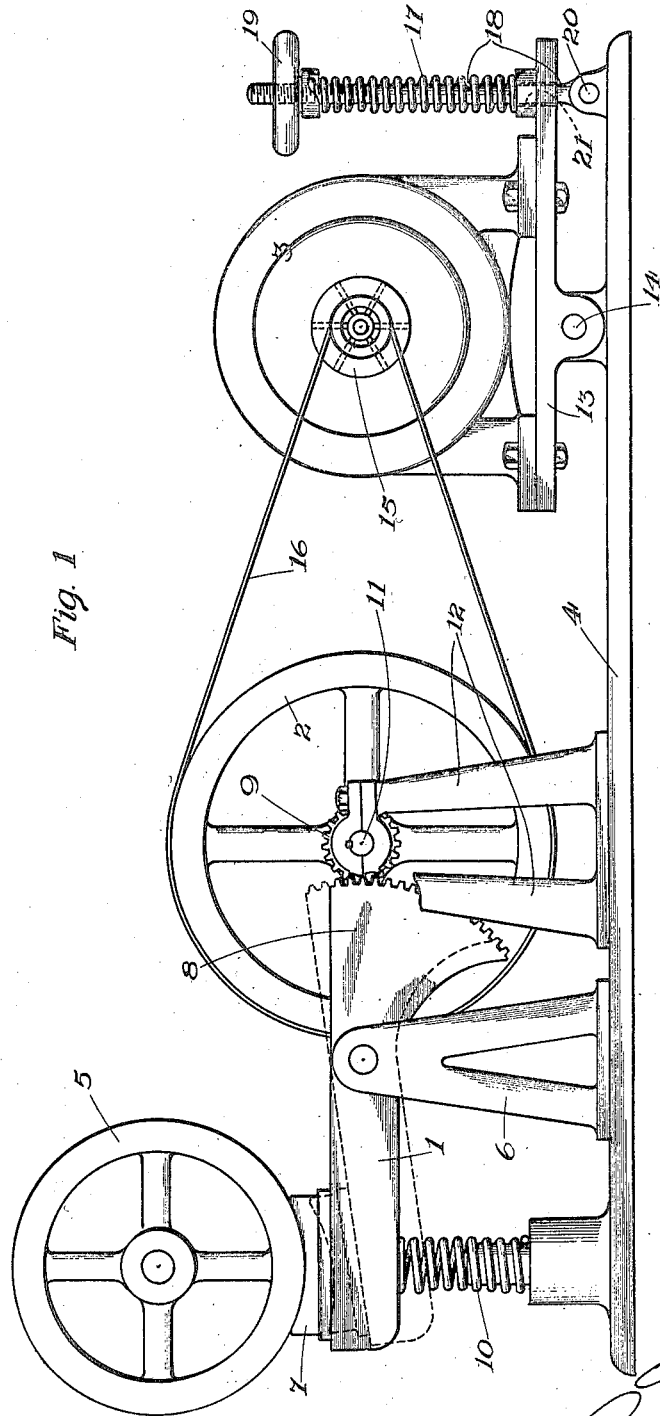
Figure 1 is a side elevation of an improved automatic safety brake mechanism constructed in accordance with this invention.

An automatic safety brake mechanism constructed in accordance with this invention involves the use of a brake member retractable from its normal braking position by the partial rotation of a rotatable or driven member connected to a driving member by a belt which is tensioned by suitable means so that the belt will deliver a constant torque to the driven member sufficient to effect the aforesaid partial rotation of said driven member and its retention in such position as long as the driving member continues to operate.

In the specific embodiment herein shown, a brake member 1, a connected rotatable or driven member 2, and a driving member 3 are arranged upon a suitable base 4 so as to provide a complete unitary structure capable of being set into position to act upon the desired part of the apparatus with which it is to be operated. In the drawings, the brake mechanism is shown in conjunction with a rotatable element 5 such as a brake drum or wheel of an elevator hoisting apparatus.

The brake member 1 is in the form of an arm pivotally mounted upon a bracket 6 secured to the base 4. The outer end of the arm is provided with a brake shoe 7 which is adapted to contact with the surface of the drum or rotatable element 5. The inner end of the arm has a gear segment 8 formed thereon which meshes with a gear or pinion 9 connected to rotate with the driven member 2. A spring 10 suitably arranged upon the base 4 abuts against the outer end of the arm 1 and normally urges the shoe 7 into its effective or braking position. The size and the strength of this spring is such as will provide the desired pressure of the brake shoe 7 against the rotatable element 5.

The driven member 2 is herein shown in the form of a pulley secured to a shaft 11 journaled in brackets 12 mounted on the base 4. The shaft 11 has the gear or pinion 9 keyed thereto.

The driving member 3 is herein shown in the form of a motor arranged upon a support 13 which is pivotally mounted at 14 upon the base 4. A pulley 15 is secured to the motor shaft and is connected by a belt 16 to the driven member 2.

In order to secure a uniform tension upon the belt 16, and deliver a constant torque to the driven member 2, belt-tensioning means are provided for urging the pivotally mounted motor 3 away from the driven member 2. These tensioning means, as herein shown, comprise a spring 17 embracing a rod 18 and interposed between the support 13 and a threaded nut 19 mounted on the outer end of the rod 18. The rod 18 is pivotally mounted at 20 to the base 4 and extends through an opening 21 in the support 13. The spring 17 bearing between the nut 19 and the support 13 normally urges the axis of the driving member 3 away from the axis of the driven member 2 and thereby automatically creates a certain tension upon the belt 16 which tension is always the same regardless of the weather conditions to which the belt may be subjected or irregularities in operating conditions. The amount of tension on the belt and the consequent torque can be altered at will by a regulation of the nut 19.

By thus creating a predetermined tension on the belt 16 and maintaining it constant, the torque on the driving member is likewise maintained constant. In this way, the driving member can be made to partially rotate the driven member 2 and hold it in its rotated position against the force of the spring 10, the action being communicated through the gear 9 and segment 8 to arm 1 causing it to swing down against the spring 10 a sufficient distance to free the rotatable element 5.

Figure 2:
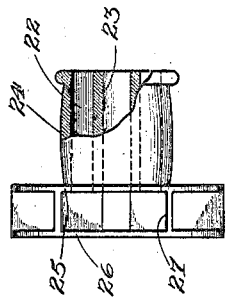
Figure 2 is an enlarged side elevation of one form of pulley constructed to dissipate heat created by a slipping belt, such a pulley being essential to the practical use of a brake mechanism of this kind.

The relative slipping of the belt caused by the continuous rotation of the pulley 15 heats the belt and the pulley and unless the heat is dissipated, would cause injury to the belt. Accordingly it is essential to the practical operation of a device of this kind to make use of some form of pulley which can be cooled. One form of pulley particularly suited for this purpose is a ventilated pulley such as that shown in U. S. Patent 1,372,700, granted March 29, 1921. This form of pulley is more clearly illustrated in Figure 2 the same having an axially disposed annular passage 22 between the hub 23 and the rim 24 communicating at its inner end with a radially disposed annular passage formed between the flanges 25 and 26. Vanes 27 are arranged between the flanges 25 and 26 so as to form a fan which, when the pulley is rotating, draws air in through the passage 22 and discharges it centrifugally outward from between the flanges 25 and 26.

A brake mechanism constructed in accordance with this invention is particularly suitable for use with electric elevator apparatus. When thus used, the motor or driving member 3 would be connected with the controller in the car in such a manner that upon the shifting of the controller the circuit to the motor 3 will be closed causing the motor to operate instantly and retract the brake 1 as has already been explained. So long as the elevator is in motion the motor 3 continues to operate and hold the brake member 1 retracted. However, as soon as the controller is shifted to cut off the current the motor will cease to exert a pull on the driven member 2 whereupon the spring 10 will act to throw the brake shoe 7 into position against the rotating element 5 with which it is arranged to coact.

Although but one specific embodiment of this invention has been herein shown and described, it will be understood that numerous details of the construction shown may be altered or omitted without departing from the spirit of this invention as defined by the following claims.

I claim:

1. In a device of the class described, the combination of a shiftable brake member, a rotatable member, mechanism connecting said brake member to be actuated by said rotatable member, a driving member, a belt connecting said driving member with said rotatable member, and means for creating a tension on said belt sufficient to cause the rotation of said driving member to shift and hold said brake member in its retracted position.

2. In a device of the class described, the combination of a shiftable brake member, a rotatable member, mechanism connecting said brake member to be actuated by said rotatable member, means normally urging said brake member into its braking position, a driving member, a belt connecting said driving member with said rotatable member, and means for creating a tension on said belt sufficient to cause the rotation of said driving member to shift and hold said brake member against the action of said means.

3. In a device of the class described, the combination of a pivotally mounted member, a brake shoe carried on one end of said member, a spring normally urging said member to move said shoe into its braking position, a rotatable member, gearing connecting said rotatable member with said pivotally mounted member, a driving member, a belt connecting said driving member with said rotatable member, and means for creating a tension on said belt sufficient to cause said driving member to actuate said rotatable member and through said gearing shift said pivotally mounted member and hold same in its retracted position.

4. In a device of the class described, the combination of a pivotally mounted member, a brake shoe carried on one end of said member, a spring normally urging said member to move said shoe into its braking position, a rotatable member, gearing connecting said rotatable member with said pivotally mounted member, a driving member, a belt connecting said driving member with said rotatable member, means for creating a tension on said belt sufficient to cause said driving member to actuate said rotatable member and through said gearing shift said pivotally mounted member and hold same in its retracted position, and other means for adjusting said tension means so as to regulate the retraction of said brake-shoe member.

5. In a device of the class described, the combination of a base, a member pivotally mounted on said base and provided with a brake shoe at one end and a gear segment at the other, a spring normally urging said member to locate said brake shoe in its functioning position, a driven member journaled on said base and having a gear meshing with said gear segment, a driving member journaled on a support pivotally mounted on said base, a belt connecting said driving member with said driven member, and a spring acting between said base and said support normally urging said driving member to automatically create a uniform tension on said belt whereby said driving member will actuate said driven member to retract said brake-shoe member and hold the same in its retracted position so long as said driving member is rotating.

6. In a device of the class described, the combination of a shiftable brake member, a rotatable member, mechanism connecting said brake member to be actuated by said rotatable member, an electric motor, a belt connecting said motor with said rotatable member, and means for creating a tension on said belt sufficient to cause the rotation of said motor to shift and hold said brake member in its retracted position.

7. In a device of the class described, the combination of a base, a member pivotally mounted on said base and provided with a brake shoe at one end and a gear segment at the other, a spring normally urging said member to locate said brake shoe in its functioning position, a driven member journaled on said base and having a gear meshing with said gear segment, an electric motor journaled on a support pivotally mounted on said base, a belt connecting said motor with said driven member, a spring acting between said support and said base and normally urging said motor to automatically create a uniform tension on said belt whereby said driven member is actuated to retract said brake shoe member and to hold same in its retracted position so long as said motor is rotating.

Signed at Chicago this 17th day of August, 1921.

AUSTIN KIMBLE.